(12) United States Patent
Ternström et al.

(10) Patent No.: US 12,215,459 B2
(45) Date of Patent: Feb. 4, 2025

(54) SEPARATION OF FIBERS

(71) Applicant: CIRCULOSE AB, Stockholm (SE)

(72) Inventors: Michael Ternström, Skoghall (SE); Amy Tran Carlström, Kristinehamn (SE); Mikael Lindström, Lidingo (SE); Zaheer Ahmad Mansoor, Kristinehamn (SE)

(73) Assignee: CIRCULOSE AB, Stockholm (SE)

( * ) Notice: Subject to any disclaimer, the term of this patent is extended or adjusted under 35 U.S.C. 154(b) by 608 days.

(21) Appl. No.: 17/415,978

(22) PCT Filed: Dec. 18, 2019

(86) PCT No.: PCT/EP2019/085901
§ 371 (c)(1),
(2) Date: Jun. 18, 2021

(87) PCT Pub. No.: WO2020/127453
PCT Pub. Date: Jun. 25, 2020

(65) Prior Publication Data
US 2022/0112658 A1 Apr. 14, 2022

(30) Foreign Application Priority Data
Dec. 19, 2018 (SE) .................................. 1851612-0

(51) Int. Cl.
*D21B 1/26* (2006.01)
*D21B 1/02* (2006.01)
*D21B 1/30* (2006.01)
*D21B 1/38* (2006.01)

(52) U.S. Cl.
CPC .............. *D21B 1/026* (2013.01); *D21B 1/30* (2013.01); *D21B 1/38* (2013.01)

(58) Field of Classification Search
CPC ...................................................... D21B 1/026
USPC .......................................................... 162/4
See application file for complete search history.

(56) References Cited

U.S. PATENT DOCUMENTS

| | | | |
|---|---|---|---|
| 3,937,675 | A | 2/1976 | Gruntfest et al. |
| 3,941,688 | A | 3/1976 | Saitoh et al. |
| 4,040,949 | A | 8/1977 | Saitoh et al. |
| 6,920,983 | B2 | 7/2005 | Gabl |
| 8,877,992 | B2 * | 11/2014 | Appel ............... B09B 3/40 585/240 |
| 2009/0062581 | A1 | 3/2009 | Appel et al. |
| 2014/0238626 | A1 * | 8/2014 | Tsuji ............... D21C 3/18 162/72 |
| 2016/0369456 | A1 * | 12/2016 | Flynn ............... D21C 3/20 |
| 2018/0215893 | A1 | 8/2018 | Flynn et al. |

FOREIGN PATENT DOCUMENTS

| | | |
|---|---|---|
| CA | 966087 | 4/1975 |
| CN | 102747622 | 10/2012 |
| CN | 104169491 | 11/2014 |
| CN | 107245161 | 10/2017 |
| GB | 1373708 A | 11/1974 |
| GB | 1416273 A | 12/1975 |
| GB | 2010279 A | 6/1979 |
| RU | 2671320 | 10/2018 |
| WO | 98/15686 | 4/1998 |
| WO | 2010/124944 | 11/2010 |
| WO | 2013/124265 | 8/2013 |
| WO | 2013/182801 | 12/2013 |
| WO | 2014/045062 | 3/2014 |
| WO | 2015/077807 | 6/2015 |
| WO | WO2015077807 A1 | 6/2015 |
| WO | 2018/073177 | 4/2018 |
| WO | 2018/104330 | 6/2018 |
| WO | 2018/115584 | 6/2018 |
| WO | 2018115428 A1 | 6/2018 |
| WO | 2018/197756 | 11/2018 |

OTHER PUBLICATIONS

Palme A, et al, "Chemical and ultrastructural changes in cotton cellulose induced by laundering and textile use", Cellulose 2014, 21, 681-4691 Sep. 17, 2014.
Asaadi S, et al, "Renewable High-Performance Fibers from the Chemical Recycling of Cotton Waste Utilizing and Ionic Liquid", ChemSusChem 2016, 9, 3250-3258 Oct. 31, 2016.
Handbook for Pulp & Paper Technologists, Second Edition, by Gary A Smoak, 1994, p. 215.
Papermaking Science and Technology a series of 19 books covering the latest technology and future trends, Book 7, Recycled Fiber and Deinking, 2000, p. 151-152, and 157.
Wedin H., et al, "Evaluation of post-consumer cellulosic textile waste for chemical recycling based on cellulose degree of polymerization and molar mass distribution", Textile Research Journal, 2019, vol. 89 (23-24), 5067-5075.
International Standard ISO 5351; Pulps—Determination of limiting viscosity number in cupriethylenediamine (CED) solution; Second Edition, Feb. 15, 2010; 26 pages.
European Standard EN ISO 5267-1; Pulps—Determination of drainability—Part 1: Schopper-Riegler method; Jul. 2000; 13 pages.

(Continued)

*Primary Examiner* — Jacob T Minskey
(74) *Attorney, Agent, or Firm* — Branch Partners PLLC; Bruce E. Black

(57) ABSTRACT

There is provided a method for separation of fibers in for instance recycled textile, starting with a mixture comprising cellulose fibers and non-cellulose fibers and then reducing the cellulose chain length of the cellulose fibers so that the limiting viscosity number determined according to ISO 5351 is in the interval 200-900 ml/g, mechanically breaking agglomerates of fibers into smaller pieces, adjusting the concentration of fibers to 0.1-4 wt %, and subjecting the mixture to flotation to remove the non-cellulose fibers. Non-cellulosic fibers such as synthetic fibers can be removed very specifically without or essentially without removing cellulose fibers in the mixture. This gives a very high degree of removal and simultaneously the yield is kept high because no or only few cellulose fibers are removed.

20 Claims, No Drawings

(56) References Cited

OTHER PUBLICATIONS

International Search Report and Written Opinion for PCT Application No. PCT/EP2019/085901 mailed Mar. 18, 2020.
International Preliminary Report on Patentability for PCT Application No. PCT/EP2019/085901 mailed Sep. 21, 2020.
Wedin Helena et al: "Preparation of Viscose Fibres Stripped of Reactive Dyes and Wrinkle-Free Crosslinked Cotton Textile Finish", Journal of Polymers and the Environment, Springer New York LLC, US, vol. 26, No. 9, May 5, 2018 (May 5, 2018), pp. 3603-3612.
Shen H et al: "Selective flotation separation of plastics by chemical conditioning with methyl cellulose", Resources, Conservation and Recycling, Elsevier, Amsterdam, NL, vol. 35, No. 4, Jun. 1, 2002 (Jun. 1, 2002), pp. 229-241.
Ohno Hiroyuki and Fukaya Yukinobu, Task Specific Ionic Liquids for Cellulose Technology, Chemistry Letters 2009 38:1, pp. 2-7.

\* cited by examiner

SEPARATION OF FIBERS

CROSS-REFERENCE TO RELATED APPLICATIONS

This present application is a U.S. national stage application of PCT Application No. PCT/EP2019/085901, filed Dec. 18, 2019, which claims priority to Swedish Patent Application No. 1851612-0 filed Dec. 19, 2018, both of which are hereby incorporated by reference in their entirety.

TECHNICAL FIELD

The present invention relates to a process for purifying cellulosic fibers by removing non-cellulosic fibers, such as synthetic fibers comprising man-made polymers, in particular in connection with textile recycling.

BACKGROUND

Cellulose is an important constituent in plants and comprises anhydrous glucose units. Cellulose is utilized for making synthetic fibers for instance by spinning a yarn or a thread. Recycled cellulose can be regenerated and used for spinning yarn, thread, fibers etc.

There are several known ways to dissolve cellulose for various applications including manufacture of regenerated cellulosic fiber. Sometimes expensive chemicals are used in such processes. (Ohno H and Fukaya Y (2009) Task specific ionic liquids for cellulose technology Chemistry Letters V38)

WO 2013/124265 discloses a process for the regeneration of cellulose. It discloses treatment of cellulose in an alkaline step and with oxygen. Reduction of the viscosity with oxygen is mentioned. Recycling of cloth is mentioned and a pre-treatment may be desirable to lower the degree of polymerization. It is also mentioned that the cellulose can be used to make a new fiber such as viscose.

WO 2010/1124944 discloses a process for the hydrolysis of cellulose comprising the sequential steps: a) mixing cellulose with a viscosity below 900 ml/g with an aqueous solution to obtain a liquid, wherein particles comprising cellulose in said liquid have a diameter of maximum 200 nm, wherein the temperature of the aqueous solution is below 35° C., and wherein the pH of the aqueous solution is above 12, b) subjecting the liquid to at least one of the steps: i) decreasing the pH of the liquid with at least 1 pH unit, ii) increasing the temperature by at least 20° C., and c) hydrolyzing the cellulose.

CN 102747622 discloses a process for removing the indigo color from jeans. The fabric is put water in a weight ratio of 1:20-30 and heating at 85-95° C., adding 2-3 g/l of sodium hydroxide, 4-5 g/l of peeling agent, 3-5 g/l of peregal O-25 and 4-5 g/l of sodium hydrosulfite and performing ultrasonic vibration and, draining the mixed solution, and washing the fabric using water 2-3 times.

WO 2014/045062 discloses a process for extracting polyester with the aid of solvents.

WO 2018/104330 discloses a method of treating a cellulose fiber where it is treated to swell the fiber with a reducing additive and then bleach with oxygen under alkaline conditions and/or with ozone under acidic conditions. Then a cellulose-based fiber can be made with the Viscose of Lyocell process.

WO 2018/073177 discloses a method for recycling textiles comprising cellulose with the following steps of: optionally disintegrating the textile, swelling the cellulose, under reducing conditions, wherein at least one reducing agent is present at least during a part of the swelling, and then performing at least one of the following two bleaching steps in any order: i) bleaching the material with oxygen at alkaline conditions with a pH in the range 9-13.5, and ii) bleaching the material with ozone at acid conditions below pH 6.

WO 2015/077807 discloses a process for pretreating reclaimed cotton fibres to be used in the production of moulded bodies from regenerated cellulose, wherein the pretreatment of the reclaimed cotton fibres includes a metal removing stage and an oxidative bleaching stage.

Still, there is a need for improved methods for recycling of textiles comprising both cellulose fibers as well as other fibers in a mixture. There is a need to remove fibers other than cellulose fibers. In textiles comprising mainly cellulose fibers there may be fibers made of polyester, elastan, acryl as well as other fibers that are desired to remove.

Other fibers than cellulose fibers are desired to remove since their effects during later use of the cellulose fibers are unknown. The cellulose can be used for instance for a subsequent Viscose process, a subsequent Lyocell process, a subsequent CarbaCell process or similar.

Removal of man-made polymers from recycled paper with flotation is known in the art. However, such man-made polymers are not in the form of fibers as in textiles. Further existing methods such as screen plates, drum screens, vibrating screens and pressure screening generally work well to remove man-made polymers from recycled paper.

One problem regarding removal of non-cellulosic fibers from cellulose fibers is that both the cellulose and the other materials are present in the form of fibers. This gives a considerable entanglement and difficulties of separating the fibers. This is not the case for impurities in recycled paper pulp, where the non-cellulosic materials such as synthetic polymers are not present in the form of fibers. Cellulose in textiles has longer fibers and helix shaped cellulose fibers with different surface properties compared to cellulose fibers in recycled paper.

Another difficulty regarding recycling of textiles where it is intended to use the cellulose again is that the cellulose fibers must not become too short during the process. Otherwise, they are not possible to use for subsequent processes, or less economical to use for subsequent processes. Thus, it is important to keep a high fraction of the desired cellulose structure when recycling textiles.

SUMMARY

It is an object of the present invention to obviate at least some of the disadvantages in the prior art and provide an improved process for removing non-cellulosic fibers in a mixture comprising cellulosic fibers and non-cellulosic fibers.

Although it may seem impossible to separate entangled fibers, while keeping the desired structure, the inventors have found a window where it is possible to use flotation to remove non-cellulosic fibers. In order for the flotation to work, the chain length of the cellulose has to be reduced below a certain level. However, in view of the intended use of the cellulose the chain length must not be too short. The inventors have unexpectedly found that by adjusting the chain length in a certain interval, it becomes possible to use flotation to remove non-cellulosic fibers. Without degradation, flotation is impossible to use for the cellulose fibers entangled with synthetic polymer fibers.

Because of the entanglement of the cellulose fibers with the non-cellulosic fibers, it was unexpected that flotation could be used in this context.

In a first aspect there is provided a method for separation of fibers comprising the steps of:
a) providing a mixture comprising cellulose fibers and non-cellulose fibers,
b) reducing the cellulose chain length of the cellulose fibers so that the limiting viscosity number determined according to ISO 5351 is in the interval 200-900 ml/g,
c) subjecting the mixture of fibers to mechanical treatment to break agglomerates of fibers into smaller pieces,
d) adjusting the concentration of fibers in the mixture so that it is in the interval 0.1-4 wt % fibers calculated by weight, and
e) subjecting the mixture to flotation to remove the non-cellulose fibers.

In a second aspect there is provided a cellulose containing material obtained with the method described above.

In a third aspect there is provided use of recycled cellulosic material as described above in a process for production of viscose.

Advantages of the invention include that non-cellulosic fibers such as synthetic fibers can be removed in a very specific way without or essentially without removing cellulose fibers in the mixture. This gives a very high degree of removal and simultaneously the yield is kept high because no or only few cellulose fibers are removed. The cellulose fibers are preserved to such an extent that they can be used for manufacturing of viscose and other purposes. It also gives the possibility of recovering the removed non-cellulosic fibers.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term "cellulosic" as used herein refers to all natural cellulosic forms (cotton, linen, jute, etc.) and all regenerated cellulosic forms such as rayon. In particular, all textiles comprising cellulose are encompassed including textiles comprising treated and modified cellulose. The term "non-cellulosic" then refers to materials and fibers, which are not built up or made of cellulose.

By "dissolving pulp" (which is sometimes also called dissolving cellulose), is meant a bleached wood pulp or cotton linters that has a high cellulose content (>90 wt %). It has special properties including as a high level of brightness and uniform molecular-weight distribution. Dissolving pulp is so named because it is not made into paper, but dissolved either in a solvent or by derivatization into a homogeneous solution, which makes it completely chemically accessible and removes any remaining fibrous structure.

By "limiting viscosity number" is meant the limiting viscosity number determined according to ISO 5351. Sometimes the term intrinsic viscosity is used as a synonym. The cellulose chain length is shortened during the process, however a direct measurement of the cellulose chain length is difficult to perform rapidly and efficient. The limiting viscosity number is related to the chain length of the cellulose and can thus be used as an indirect measure of the chain length of cellulose, in particular if for instance a decrease of the chain length is to be made. It is generally accepted that the limiting viscosity number is related to the chain length of cellulose. There may not always be a direct correlation between the chain length and the limiting viscosity number, but for the purpose of the present invention, the existing relation is sufficient.

By "mixture" is in the context of the present method meant the subject of the process. It is understood that the mixture will vary during the process. The starting mixture is thus not the same as the final mixture, although the term "mixture" is used throughout the process. After the reduction of the chain length there is a mixture with shortened cellulose chain length. After the mechanical treatment, there is a mixture with decreased agglomerates of fibers. After the adjustment of the fiber concentration there is in general a diluted mixture. After the flotation there is a purified mixture.

In a first aspect there is provided a method for separation of fibers comprising the steps of:
a) providing a mixture comprising cellulose fibers and non-cellulose fibers,
b) reducing the cellulose chain length of the cellulose fibers so that the limiting viscosity number determined according to ISO 5351 is in the interval 200-900 ml/g,
c) subjecting the mixture of fibers to mechanical treatment to break agglomerates of fibers into smaller pieces,
d) adjusting the concentration of fibers in the mixture so that it is in the interval 0.1-4 wt % fibers calculated by weight, and
e) subjecting the mixture to flotation to remove the non-cellulose fibers.

The mixture comprises both cellulose fibers as well as non-cellulose fibers and it is desired to separate those fibers. In one embodiment, the mixture comprises a high fraction of cellulose fibers with smaller quantities of non-cellulosic fibers comprising man-made polymers. Recycles textiles come in many different fractions and for some fractions, there is a high content of cellulose fibers with additional content of various other fibers including for instance polyester, elastane and so on. In one embodiment, the mixture are recycled textiles comprising 95-99 wt % cellulose fibers and about 1-2 wt % polyester.

During the step of reducing the cellulose chain length of the cellulose fibers so that the limiting viscosity number determined according to ISO 5351 is in the interval 200-900 ml/g, the mixture is typically aqueous, i.e. the fibers are mixed with water. Water is by far the most realistic solvent for a process in large scale, although it is in theory possible to use other solvents as well. In one embodiment, the chain length of the cellulose fibers is reduced so that the limiting viscosity number determined according to ISO 5351 is in the interval 300-900 ml/g. In one embodiment, the chain length of the cellulose fibers is reduced so that the limiting viscosity number determined according to ISO 5351 is in the interval 400-600 ml/g.

In one embodiment, the chain length of the cellulose fibers is reduced so that the limiting viscosity number determined according to ISO 5351 is at least 550 ml/g. In one embodiment, the chain length of the cellulose fibers is reduced so that the limiting viscosity number determined according to ISO 5351 is at least 400 ml/g. In one embodiment, the chain length of the cellulose fibers is reduced so that the limiting viscosity number determined according to ISO 5351 is at least 500 ml/g. In one embodiment, the chain length of the cellulose fibers is reduced so that the limiting viscosity number determined according to ISO 5351 is at least 250 ml/g. In one embodiment, the chain length of the cellulose fibers is reduced so that the limiting viscosity number determined according to ISO 5351 is not more than 700 ml/g. In one embodiment, the chain length of the cellulose fibers is reduced so that the limiting viscosity number determined according to ISO 5351 is not more than 600 ml/g. The limiting viscosity number for cellulose in textiles is as good as always higher than the interval 200-900 ml/g and thus a reduction is in general needed.

It is an unexpected finding that flotation is possible to use if the cellulose chain length is reduced. Because of the entanglement of the different fibers is would have been expected that flotation cannot be used. However, the chain length cannot be reduced too much so that the cellulose becomes impossible to use of less attractive to use for subsequent steps of regeneration of the cellulose. For instance for a Lyocell process it is desired to have a limiting viscosity of about 400 ml/g or higher. For a CarbaCell process, it may be sufficient with 250 ml/g or higher.

In one embodiment, the chain length of the cellulose fibers is reduced by treatment with ozone under acid conditions below pH 6. In one embodiment, the chain length of the cellulose fibers is reduced by treatment with oxygen under basic conditions above pH 10. These two reductions of the chain length can be combined after each other. One advantage of using treatment with ozone is that the cellulose chains are weakened during the treatment. If step b) to reduce the chain length of the cellulose fibers comprises treatment with ozone and if step c) is performed after step b), then the cellulose fibers will be weakened during step b), but the non-cellulosic fibers will generally not be weakened, at least not to the same degree as the cellulose fibers. During the subsequent step c) the mechanical treatment will then to an increased extent break the weakened cellulose fibers, but to a lesser extent the non-cellulosic fibers. The modified propensity of breaking will give shorter cellulose fibers and essentially unchanged non-cellulosic fiber length during mechanical treatment in step c). The shortened cellulose fibers and to some extent preserved non-cellulosic fibers make it easier to separate away the non-cellulosic fibers by flotation. Thus, in one embodiment, step c) is performed after step b) and step b) comprises treatment with ozone and optionally other steps.

In one embodiment, step c) is performed before step b). The step of reduction of the cellulose chain length b) and step of the mechanical treatment c) can be performed in any order. Step b) can be divided into several steps performed at different points in the method.

In addition, the step d) can be performed in any order in relation to the steps b) and c). It can be performed before, between or after the steps b) and c). Step d) is in most cases a dilution since it is more economical to keep the fiber concentration high during steps b) and c), thus in most cases step d) is performed after steps b) and c) and before the flotation in step e).

In one embodiment, step c) is performed by grinding. Other mechanical treatment methods may also be used in order to mechanically separating pieces of fibers into smaller pieces. Any agglomerates of fibers are ground to break them into smaller pieces. If the mixture of fibers is such that agglomerates of fibers do not exist, this step may be omitted. For most fiber mixtures, in particular, for recycled textiles, agglomerates are present and then the mechanical treatment step c) cannot be omitted. The agglomerates comprise entangled fibers. Agglomerates of different fiber types makes it difficult to separate the fibers in flotation or will decrease the yield of the flotation since more fibers may be rejected in agglomerates.

In one embodiment, the concentration of fibers in the mixture is adjusted during step d) so that it is in the interval 0.2-1.5 wt % fibers calculated by weight. In one embodiment, the concentration of fibers in the mixture is adjusted during step d) so that it is in the interval 0.7-1.5 wt % fibers calculated by weight. In another embodiment, the concentration of fibers in the mixture is adjusted during step d) so that it is in the interval 0.7-2 wt % fibers calculated by weight. The adjustment of the concentration is in most embodiments a dilution.

In one embodiment, the mixture is aqueous. Water is mixed with the fibers in the beginning of the method.

In one embodiment, the flotation is performed in several chambers connected in series. In one embodiment, the flotation is performed by using more than one air diffuser nozzle, giving different bubble sizes. In one embodiment, several chambers are used wherein each chamber is supplied with air bubbles of different sizes. This will serve to remove fibers of different sizes in different chambers.

In one embodiment, the mixture is filtered before the flotation in step e). Such an optional filtration step can ensure that any remaining larger agglomerates of entangled fibers are not subjected to flotation. In one embodiment, the reject from a filter before the flotation is ground and filtered again. Any removed larger agglomerates are ground and supplied to the filter again.

In one embodiment, the mixture is made of textiles to be recycled. In general, the process is intended for recycled textiles although other applications also are envisaged.

In one embodiment, the textiles are ground in dry state before step a). This additional dry step may include cutting and chopping the textiles to small pieces.

In one embodiment, the mixture is treated in water under reducing conditions and a pH above 10 before step b). This optional step is performed before reducing the cellulose chain length in step b). In one embodiment, the reducing conditions are achieved by addition of dithionite anions. In one embodiment, sodium dithionite is added. The inventors believe that this treatment under reducing conditions at high pH achieves a swelling of the cellulose fibers, which in turn helps separating the non-cellulosic fibers from the cellulose fibers during the subsequent flotation.

In one embodiment, with treatment in water under reducing conditions and a pH above 10, additional grinding is performed in wet state. This additional grinding is in one embodiment, performed when the reducing conditions are present.

In one embodiment, the non-cellulose fibers are synthetic fibers comprising man-made polymers. Examples of synthetic fibers comprising man-made polymers include but are not limited to fibers based on nylon, fibers based on polyester, fibers based on acrylic, fibers based on modacrylic, fibers based on polyurethane, and fibers based on polyolefin. Such fibers are well known in the art and are widely used today. In one embodiment, the non-cellulose fibers comprise polyester. In one embodiment, the non-cellulose fibers comprise elastane. In one embodiment, the non-cellulose fibers comprise polyacrylonitrile. Cellulose based fibers are commonly mixed with smaller amounts of non-cellulosic fibers in commercially available textiles. For instance, cellulose fibers made from cotton are often mixed with a few percent polyester based fibers.

In one embodiment, the mixture after step e) is dewatered and dried. The dewatering and drying is performed using known techniques in the art of pulping including for instance vacuum dewatering, pressing and drying.

The resulting product from the method can be used in many different ways. It can be used as a raw material for the regeneration of cellulose alone or in mixtures with other material. In certain cases, the material can replace cotton linters.

In one embodiment, the mixture after step e) is used as a raw material in a Viscose manufacturing process. In one embodiment, when the resulting mixture is to be used in the Viscose process, the limiting viscosity number determined according to ISO 5351 is reduced to a value higher than 550 ml/g in step b).

In one embodiment, the mixture after step e) is used as a raw material in a Lyocell manufacturing process. In one embodiment, when the resulting mixture is to be used in the Lyocell process the limiting viscosity number determined according to ISO 5351 is reduced to a value higher than 400 ml/g in step b).

In one embodiment, the non-cellulosic fibers are recovered and optionally further purified. The non-cellulosic fibers are in one embodiment, collected and used for various purposes.

In one embodiment, at least one surfactant is added before the flotation in step e). A surfactant is any surface active agent. Examples include compounds with a hydrophilic part and a hydrophobic part. In one embodiment, a saponificated fatty acid is used as surfactant. Surfactants with a large variety of polar and nonpolar groups can be used for flotation. A surfactant whose primary role is to render the solid surface hydrophobic is called a collector. Surfactants whose primary role is to provide the required stability to the top froth layer in the flotation cell and to influence the kinetics of particle-bubble attachment are referred to as frothers. These are usually nonionic surfactants which can enhance the rate of film thinning and contribute to the stability of the particle-bubble aggregates. In further embodiments, other additives are added before or during the flotation in step e). Examples include but are not limited to defoamers, foam stabilizers, and substances for increasing or decreasing the water hardness. Additives commonly used for flotation are added in one embodiment.

In one embodiment, an additional flotation step is performed before at least one of the steps c) and d). This serves as an additional pre-flotation and removes for instance larger agglomerates and other impurities. In one embodiment, agglomerates from this pre-flotation are treated mechanically to break the agglomerates for instance by grinding. In one embodiment, agglomerates separated in the additional flotation are subjected to mechanical treatment to disintegrate the agglomerates. The additional flotation is performed before the concentration is adjusted which normally is a high fiber concentration.

In one embodiment the flotation in step e) is repeated in order to improve the removal of unwanted fibers.

In one embodiment, the mixture provided in step a) are textiles comprising at least one of cotton and regenerated cellulose fibers.

In one embodiment the temperature during the flotation in step e) is in the interval 30-90° C. during at least a part of the flotation. In one embodiment the temperature during the flotation in step e) is in the interval 50-80° C. during at least a part of the flotation. The temperature is in one embodiment in the mentioned range during the entire flotation. In an alternative embodiment the temperature is in the mentioned interval during a part of the flotation. The latter embodiment may be relevant in several flotation steps are carried out in series. A temperature in the interval 30-90° C., preferably 50-80° C. gives a better effect and a lower viscosity of the aqueous solvent. In an alternative embodiment the flotation is carried out at ambient temperature.

In a second aspect there is provided a cellulose containing material obtained by the method as described above.

In a third aspect there is provided use of recycled cellulosic material for production of viscose.

Other features and uses of the invention and their associated advantages will be evident to a person skilled in the art upon reading this description and the appended examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

Fiber Material

Fibers: Cotton containing smaller amounts of non-cellulosic fibers from textile fabrics waste. The fibers were disintegrated and bleached. First, the fibers were disintegrated from any woven and spun structures and refined into shorter fiber length. Second, the fibers were treated with a redox reaction with dithionite and further with ozone bleaching (acidic condition) and oxygen bleaching (alkaline condition). Last, the fibers were refined again to remove any knots and lumps.

A measuring cylinder of 1 liter (Diameter: 90 mm; H: 210 mm) and round air stone (Diameter: 80 mm; H: 20 mm) was used in the experiment. The measuring cylinder was filled with 500 ml fiber-suspension, 0.5 wt %. The air stone was placed in the bottom of the cylinder, and this created a homogenous flow of air bubbles in the fiber suspension. 1-2 drops of flotation agent was added to obtain foam that functioned as carrier of the non-cellulosic fibers. The non-cellulosic fibers were attached on to the surface of the bubbles and were removed when the foam reached over the cylinder top.

The flotation experiment was repeated three times using the same fiber mixture. The resulting remaining non-cellulosic fiber content can be seen in the below table for samples 1-3 from the different experiments. Two measurements of the original non-cellulosic fiber content were made and the results can be seen in the table. One flotation step reduced the non-cellulosic fiber content with 89.1% on average.

|  | Non-cellulosic fiber content |
| --- | --- |
| Sample 1 | 0.18 wt % |
| Sample 2 | 0.12 wt % |
| Sample 3 | 0.20 wt % |
| Reference 1 | 1.76 wt % |
| Reference 2 | 1.35 wt % |
| Average reduction of non-cellulosic fibers | 89.1% |

Example 2

A Voith laboratory flotation cell Delta 25 was used. Different mixtures of various fibers were used.

FM: Cotton fibers from white clippings. The fibers comprise smaller amounts of non-cellulosic fibers, for instance of polyester. The fibers were disintegrated and bleached. First, the fibers were disintegrated from any woven and spun structures and refined into shorter fiber length. Second, the fibers were treated with a redox reaction with dithionite and further with ozone bleaching (acidic condition) and oxygen bleaching (alkaline condition). Last, the fibers were refined again to remove any knots and lumps.

HM+polyester: Raw material: white clippings. Pulp refined by a valley beater with extra green polyester added.

HM/FM+polyester: The same fiber as FM above, but with addition of green polyester and additional refining with a valley beater.

SR in the table indicate the degree of milling of the different fibers. A higher number means smaller fibers.

The above fiber mixtures were run in the flotation cell at 1 wt % pulp concentration, flotation volume 24 liters, temperature 21° C., airflow rate 11 l/min, pH 9-10. The above different mixtures were run with a flotation time of 6, 9, and 12 minutes respectively.

The flotation samples were run with and without addition of a saponicated olefinic fatty acid. In the flotation cell 150 g saponicated fatty acid was added. The saponicated fatty acid was made by reacting 0.8 wt % fatty acid and 2 wt % NaOH.

The FM fibers described above were also run in a mechanical filtration process to compare the results. This test is called FM slide pac.

|  | SR | Start cotton content [Cotton wt %] | End cotton content (after 12 min) [Cotton wt %] | Increased cotton content [weight percent units] | Reject [Polyester wt %] |
| --- | --- | --- | --- | --- | --- |
| FM | 25.5 | 97.3 | 97.4 | 0.14 | 47.6 |
| FM + Fatty acid | 25.5 | 97.4 | 98.4 | 1.02 | 29.2 |
| HM + Polyester | 21 | 89.4 | 90.6 | 1.21 | 54.3 |
| HM + Polyester + Fatty acid | 21 | 92.9 | 94.7 | 1.81 | 16.2* |
| HM/FM + Polyester | 31 | N/A** | N/A** | N/A** | N/A** |
| HM/FM + Polyester + Fatty acid | 31 | 91.9 | 94.6 | 2.75 | 60.7 |
| FM SlidePac | 25.5 | 96.4 | 97.2 | 0.8 | 4.3 |

*High cellulose concentration: 1.35 wt %
**Not able to create foam

As can be seen the flotation is an efficient way to separate cellulose fibers such as cotton fibers from other fibers such as polyester fibers. The reject concentration of polyester reached as high as 60.4 wt %. This implies a lower loss of cellulosic fibers.

The invention claimed is:

1. A method for separation of fibers comprising the steps of:
    a) providing a mixture of textile fibers comprising cellulose fibers and non-cellulose fibers,
    b) reducing the cellulose chain length of the cellulose fibers so that the limiting viscosity number determined according to ISO 5351 is in the interval 200-900 ml/g,
    c) subjecting the mixture of textile fibers to mechanical treatment to break agglomerates of textile fibers into smaller pieces,
    d) adjusting the concentration of textile fibers in the mixture so that it is in the interval 0.1-4 wt % textile fibers calculated by weight, and
    e) subjecting the mixture to flotation to remove the non-cellulose fibers.

2. The method according to claim 1, wherein the chain length of the cellulose fibers is reduced by treatment with ozone under acid conditions below pH 6.

3. The method according to claim 1, wherein the chain length of the cellulose fibers is reduced by treatment with oxygen under basic conditions above pH 10.

4. The method according to claim 1, wherein step c) is performed before step b).

5. The method according to claim 1, wherein step c) is performed by grinding.

6. The method according to claim 1, wherein the concentration of textile fibers in the mixture is adjusted during step d) so that it is in the interval 0.2-1.5 wt % textile fibers calculated by weight.

7. The method according to claim 1, wherein the flotation is performed by using more than one air diffuser nozzle, giving different bubble sizes.

8. The method according to claim 1, wherein the mixture is filtered before the flotation in step e).

9. The method according to claim 8, wherein the reject from a filter before the flotation is ground and filtered again.

10. The method according to claim 1, wherein the mixture is made of textiles to be recycled.

11. The method according to claim 10, wherein the mixture is treated in water under reducing conditions and a pH above 10 before step b).

12. The method according to claim 11, wherein the reducing conditions are achieved by addition of dithionite anions.

13. The method according to claim 11, wherein additional grinding is performed in wet state.

14. The method according to claim 1, wherein the mixture after step e) is dewatered and dried.

15. The method according to claim 1, wherein the mixture after step e) is used as a raw material in a Viscose manufacturing process.

16. The method according to claim 1, wherein the mixture after step e) is used as a raw material in a Lyocell manufacturing process.

17. The method according to claim 1, wherein at least one surfactant is added before the flotation in step e).

18. The method according to claim 1, wherein an additional flotation step is performed before at least one of the steps c) and d).

19. The method according to claim 18, wherein agglomerates separated in the flotation are subjected to mechanical treatment to disintegrate the agglomerates.

20. The method according to claim 1, wherein the temperature during the flotation in step e) is in the interval 30-90° C. during at least a part of the flotation.

* * * * *